INVENTORS.
DAVID M. BARRETT
CHARLES R. HEHMEYER
BY
ATTORNEYS.

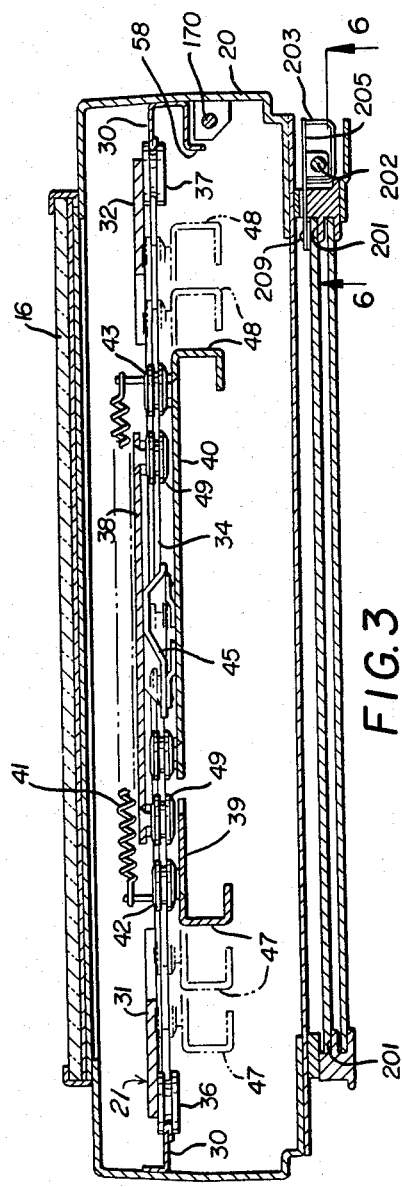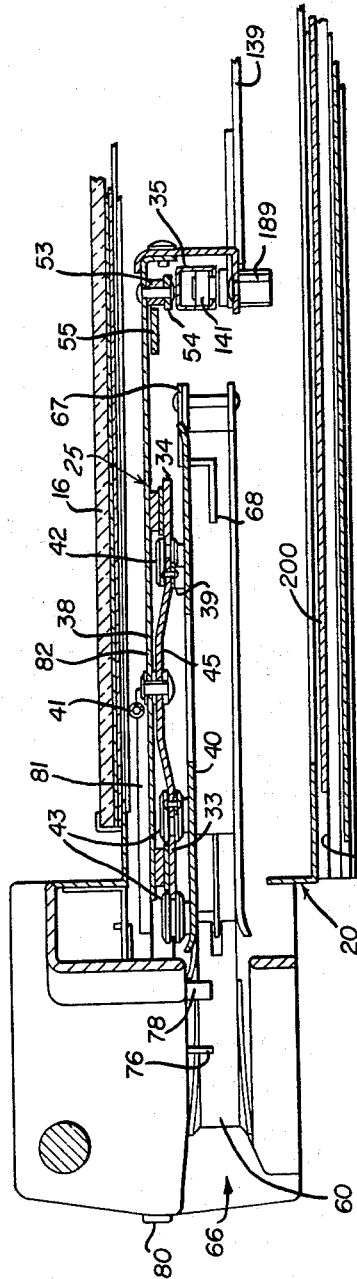

March 9, 1965

D. M. BARRETT ETAL 3,173,010

SPOT FILMER DRIVE SYSTEM

Original Filed Dec. 28, 1961

INVENTORS
DAVID M. BARRETT
CHARLES R. HEHMEYER
BY
*Watts & Fisher*
ATTORNEYS

United States Patent Office 3,173,010
Patented Mar. 9, 1965

3,173,010
SPOT FILMER DRIVE SYSTEM
David M. Barrett, Lyndhurst, and Charles R. Hehmeyer, Willoughby, Ohio, assignors to Picker X-Ray Corporation, Waite Manufacturing Division, Inc., Cleveland, Ohio, a corporation of Ohio
Original application Dec. 28, 1961, Ser. No. 165,709. Divided and this application Nov. 19, 1962, Ser. No. 238,558
19 Claims. (Cl. 250—66)

This invention pertains to medical X-ray apparatus and more specifically to that class of radiographic devices which are now known in the art as spot filmers.

This application is a division of David M. Barrett et al. application S.N. 165,709, filed December 28, 1961, entitled Spot Filmer.

A medical X-ray table is generally equipped with a device known as a spot filmer. These spot filmers include a fluoroscopic screen, or in the alternative, an image intensification tube and an associated optical system or closed circuit television arrangement. A spot filmer also includes a mechanism for selectively and sequentially positioning a photographic film carried in a film cassette for a series of radiographic exposures.

In one class of spot filmer, a motor driven carriage is provided which selectively advances a cassette to a radiographic position, and thereafter moves a cassette through a predetermined sequence of positions. One mechanism of this class is described in United States Letters Patent 2,668,913, issued February 9, 1954, under the title, "Spot Filmer," while a more recent design is described and claimed in United States Letters Patent 2,767,323 issued October 16, 1956, under the title, "Serial Filmer." This invention is directed to an improved spot filmer which has certain definite advantages over those described and claimed in these two patents.

One of the disadvantages of the spot filmers described and claimed in these two patents is that they are of the so-called "top" loading type. That is, a cassette when positioned in the carriage is inserted through a loading aperture in the top of the spot filmer. This loading aperture in most spot filmers of the so-called "top" loading type is toward the rear of the housing. When an image intensification tube is secured to the spot filmer loading becomes quite difficult and awkward since the operator must reach around the tube and over the table and patient to position the cassette.

With this invention, a spot filmer of the so-called "front" loading class is provided. The complete mechanism is described in greater detail and claimed in the above referenced patent application. This case is directed to certain positioning structure of the spot film device while other features of this spot filmer are described and claimed in other divisional applications, filed concurrently with this application. These other applications are:

(1) Carriage For Front Loaded Spot Filmer filed November 19, 1962 S.N. 238,571.
(2) Spot Filmer with Radiation Shield filed November 19, 1962 S.N. 238,482.

In the mechanism of this invention loading—and unloading—of a cassette into the cassette carriage is accomplished through a simple, direct, rectilinear movement through a loading aperture in the forward end of the spot filmer. Loading only requires inward pressure until the cassette is in place when it locks automatically while simply pressing a button results in automatic ejection of the cassette.

A principle feature of this invention is an interlock arrangement through which jams and damage from attempts to retract the carriage with an improperly positioned cassette are prevented. The interlock arrangement makes it impossible to retract the carriage from its load position unless there is either no cassette in the carriage or the cassette is properly positioned and locked in the carriage.

Lights which indicate to the operator when the device is in the load position and indicate when the device either requires unloading or resetting of the position control mechanism are another feature of the mechanism. A double-exposure switch which energizes one of these lights not only prevents double exposures but also prevents commencement of an exposure sequence until the sequence control mechanism has been set for a desired sequence.

With the spot filmer of this invention the eject button at times controls the position of the cassette carriage, while at other times the position of the carriage is controlled by the exposure button. Accordingly, one of the features of the invention resides in controls which protect the mechanism and the film when an exposure is in progress. Once the carriage is in the load position it will stay there until properly loaded or fully unloaded and the eject button is pressed. At all other times, the carriage automatically travels to a park position unless either the eject button or the exposure button is pressed and held. If both buttons are pressed and held at the same time, the eject circuit will override the exposure circuit except when an exposure is in progress. If the eject button is accidentally struck while an exposure is in progress, it cannot cause the mechanism to move.

Yet another feature of the invention resides in a novel and improved drive mechanism for a Bucky grid which permits facile parking of the grid and movement into position for radiography.

An outstanding feature of the device is an arrangement wherein the mechanism may be moved to the load-unload position at any time it is in the park position irrespective of the position control mechanism.

As an additional feature, magnetic locks are energized whenever the eject button is depressed. This locks the spot filmer and associated mechanism in a selected position.

Other features and a fuller understanding of the invention may be had by referring to the following description and claims taken in conjunction with the accompanying drawings, in which:

Figure 2:
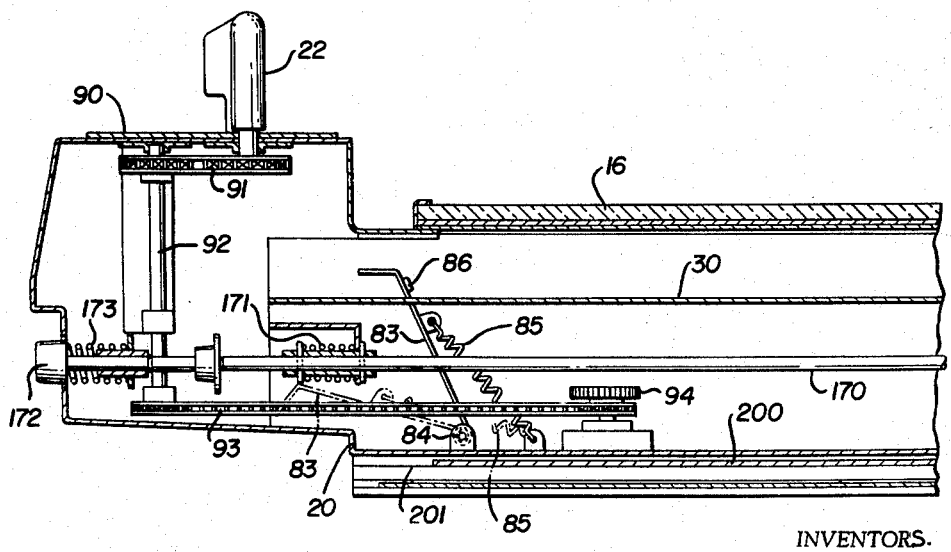
FIGURE 2 is an enlarged sectional view of the selector knob and associated mechanism as seen from the plane indicated by the line 2—2 of FIGURE 1.
Figure 5:
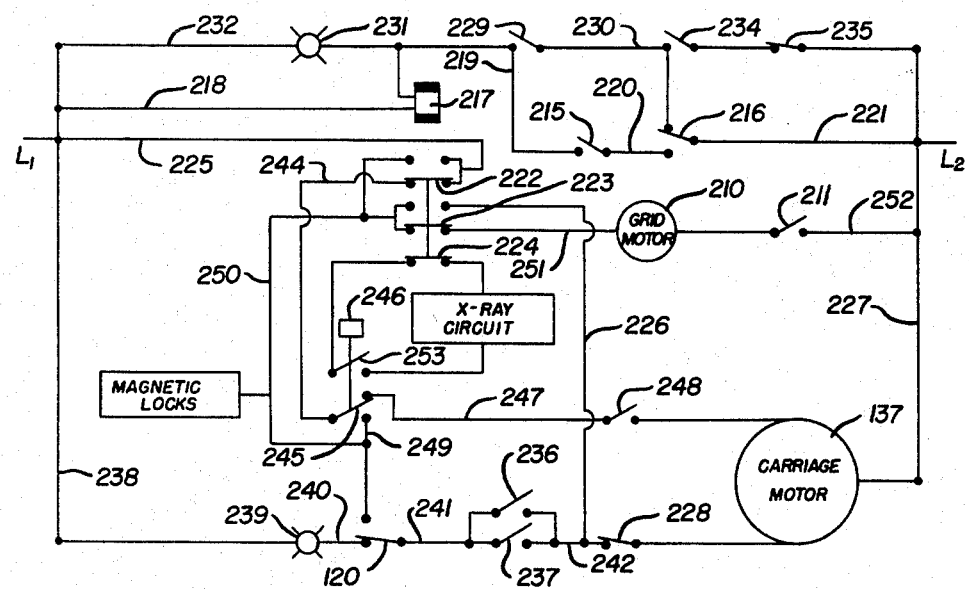
Figure 6:
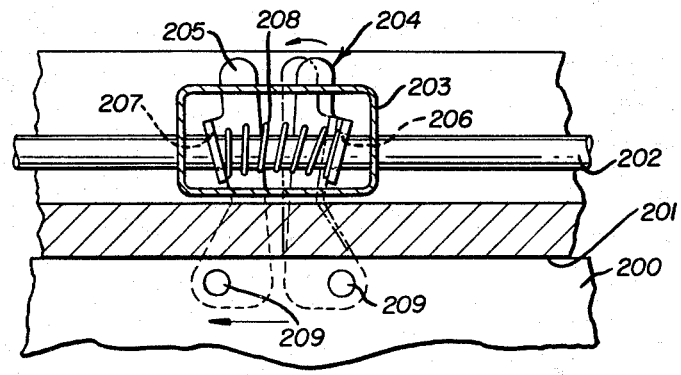
Figure 7:
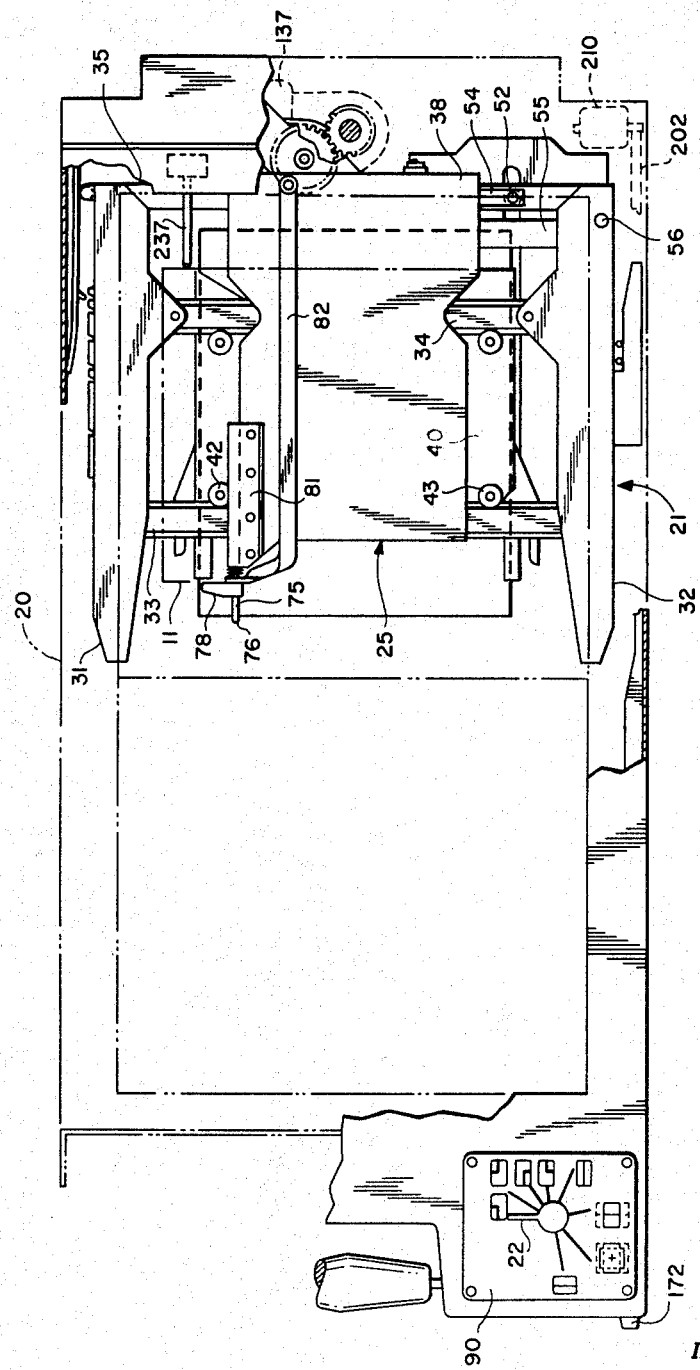

FIGURES 3 and 4 are sectional views of the devices as seen respectively from the planes indicated by the lines 3—3 and 4—4 of FIGURE 2 with the cassette in the load position;

FIGURE 5 is a circuit diagram showing the electrical control circuit;

FIGURE 6 is a sectional view on an enlarged scale of the reciprocating grid drive mechanism as seen from the plane indicated by the line 6—6 of FIGURE 3; and, FIGURE 7 is a fragmentary top plan view with parts broken away and removed of the spot filmer of this invention.

Figure 1:
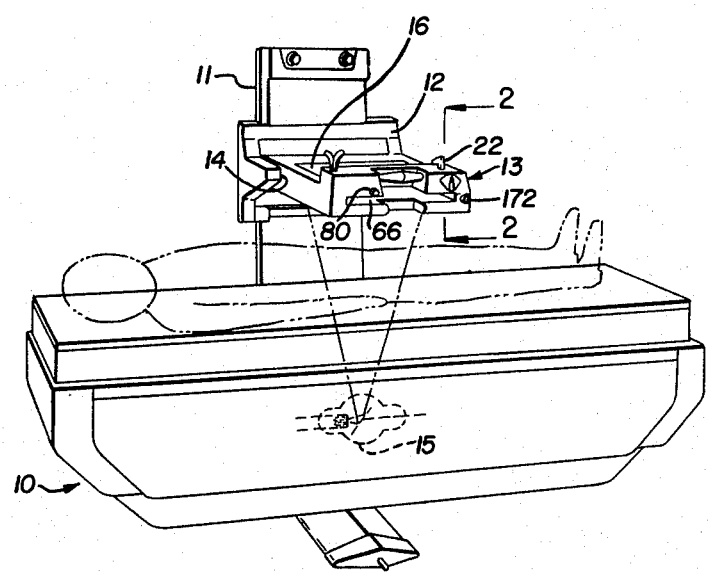
FIGURE 1 is a perspective view of an X-ray table including the spot filmer of this invention.

Referring now to the drawings and to FIGURE 1 in particular, an X-ray table is shown generally at 10. The table is preferably one of the usual and well-known types of tiltable tables. The table 10 has the usual fluoroscopic column 11 which is movably mounted in the body of the table 10 for rectilinear movement paralleling the table top and both transversely and longitudinally with respect to the top. A fluoroscopic carriage 12 is mounted on the column 11 for rectilinear movement toward and away from the body of the table 10. A spot film device 13 is mounted on the carriage 12 for movement with it. Additionally, the spot filmer 13 is pivotal about pivots 14 from the operation position shown in FIGURE 1, to a park position.

An X-ray tube 15 is carried by the column 11 and positioned within the body of the table 10. The tube 15 is positioned to selectively emit a conical-like beam of X-rays to stimulate selectively either a fluoroscopic screen 16, FIGURE 2, or a photographic film.

A spot filmer frame is shown generally at 20. A cassette carriage shown generally at 21 is mounted in the frame for rectilinear movement from a loading and unloading position of FIGURE 3 near the front of the spot filmer. The carriage is movable from the loading position to a storage position at the rear of the spot filmer. The preferred structure for shifting the carriage to the storage position and through exposure sequence is described in greater detail in the copending cases.

A selector knob 22 is positioned on the spot filmer. In order to obtain the desired exposure the operator rotates the selector knob 22 to an appropriate setting and thereafter the carriage 21 is sequentially moved through a selected sequence. The preferred mechanism for obtaining this sequence is described in greater detail in the above referenced applications.

THE CARRIAGE

The structure of the carriage is shown in FIGURES 3, 4 and 7. In FIGURE 3 a pair of longitudinal guide tracks 30 are visible. These guide tracks 30 are secured to the sides of the frame and provide a track for the rectilinear movement of the carriage 21 from its storage position to its load and unload position, and to its intermediate positions which are exposure positions.

The carriage 21 has a frame comprised of a pair of frame side members 31, 32, a pair of frame cross track members 33, 34, and a slide cross member 35. Carriage supporting wheels 36, 37 are journaled respectively on the carriage frame side members 31, 32. The carriage supporting wheels 36, 37 engage the longitudinal guide tracks for supporting the carriage 21 during the rectilinear movement. One of each of the wheels 36, 37 is visible in FIGURE 3, it being understood that there are at least two of each.

The cross carriage 25 is mounted on the carriage 21 for transverse or cross travel. The cross carriage 25 includes a top plate 38 and a pair of movable jaws 39, 40 which are of generally L-shape when viewed from the top. The jaws 39, 40 are respectively mounted for rectilinear cross travel on the cross tracks 33, 34 by wheels 42, 43 and are urged toward one another by a spring 41, FIGURE 3, secured to them. When there is no cassette in the carriage the jaws are urged into abutment by the spring 41.

A jaw coordinating link 45 is pivotally connected to the top plate 38 along the longitudinal centerline of the plate. The jaw coordinating link 45 is also pivotally connected to both of the movable jaws 39, 40. The jaw coordinating link 45 serves to maintain the jaws 39, 40 equal distances from either side of this longitudinal centerline.

The jaws each having downwardly extending cassette-gripping flanges, 47, 48 on the jaws 39, 40. These flanges serve to support a cassette when it is positioned in the carriage. In order to assure proper positioning of the cassette in each of the positions of the device, it is important to have the cassette-supporting flanges 47, 48 symmetrical about the longitudinal centerline of the cross carriage. From the preceding description, it will be apparent that the jaw coordinating link 45 serves to maintain the cassette supporting flanges 47, 48 equidistant from the cross carriage centerline plane at all times so as to properly locate a cassette, transversely speaking, in the cross carriage.

The top plate 38 has wheels 49 journaled on it, FIGURE 3. These wheels 49, like the wheels 42, 43, engage the cross track members 33, 34. The wheels 42, 43, 49 support the cross carriage 25 for cross travel on the carriage 21. Thus, the jaws 39, 40 move, upon loading or unloading of a cassette, relative to one another and relative to the top plate 38. At other times, during the operation of the device as will be explained in greater detail below, the entire cross carriage 25 moves as a unit, relative to the carriage 21 laterally along the cross tracks 33, 34.

The cross carriage 25 has three operative positions, relative to the carriage 21. When viewing the device from the front, these may be referred to as left, right and center positions. This would be movement to the left, right and center respectively in FIGURE 3. The cross carriage is selectively located in one of the three positions by a mechanism including a lock pin support 54 secured to the top plate 38. A cross travel position lock 55 is pivotally mounted on the carriage at 56, FIGURE 7, for selective engagement with lock pins 53 (FIGURE 3) or 55 (FIGURE 7). These lock pins are two of three lock pins which are selectively engaged one at a time.

A pair of cassette guide chutes are provided on the forward end of the carriage 21. One of these chutes 60 is visible in FIGURE 4 and the other is the mirror image of it. In FIGURE 4 it will be seen that the chute 60 is pivotally connected to the forward end of the frame side member 31. The other chute which is a mirror image of the chute 60 and not shown is pivotally connected to the frame side member 32. Each chute is sized for guiding sliding engagement with a cassette upon insertion of a cassette into the carriage.

Whenever a cassette is passed through a front loading opening 66 in the spot filmer, FIGURE 4, into the chutes the action of the cassettes against the chutes will cause the chutes to pivot outwardly. This outward movement moves the jaws outwardly an appropriate amount to receive the cassette being loaded.

A cassette insertion travel limiter 67 is provided. This travel limiter is an arm which is pivotally mounted near the rearward end of the movable jaw 39. The cassette travel limiter 67 includes a downwardly extending cassette engaging portion 68 which will abut the rearward edge of an inserted cassette. As the cassette moves rearwardly, it will force the engaging projection 68 to move rearwardly with it until a stop pin acts to prevent further rearward movement of the cassette.

Once rearward travel of the cassette has been arrested by the travel limiter 67, some means must be provided to retain the cassette in its appropriate and inserted position. The means to maintain the cassette in its inserted position is best understood by reference to FIGURE 7. A cassette lock bar 75 is rotatably and slidably mounted on the top plate 38. The bar 75 includes a large size cassette retainer 76 which preferably is simply the end portion of the bar 75 bent at right angles with the remainder of the bar. A spring is around the bar 75 biasing the bar outwardly and rotatably. A lock trip 82 is slidably mounted on the top plate 38. The trip includes a downwardly extending rearward projection which overlies the inner end of an inserted cassette.

When a cassette is inserted in the carriage as shown in phantom in FIGURE 7, it forces the trip 82 rearwardly which in turn moves the cassette bar 75 rearwardly. A pin on the bar 75 and a coacting groove in a bar support 81 cause relative rotation and cause the bar to shift to its locked position with the end portion 76 in the vertical position shown in FIGURE 7. A shorter cassette retainer 78 is provided to maintain smaller sized cassettes in the carriage. At all times when larger sized cassettes are in the carriage, the holder 78 rests on the top of the cassette as seen in FIGURE 7. A release mechanism for this locking arrangement is described in detail in the parent application, and not shown in the drawings in this application.

THE POSITION CONTROL MECHANISM

The operation of the position control mechanism which should be understood in order to appreciate the present invention is shown in FIGURES 2 and 7. As previously suggested, this sub-assembly includes the selector knob 22 which is positioned above a position indicating plate 90. The plate 90 indicates first, when the mechanism is set for a given and selected radiographic sequence of exposures and, second, what portion of a given and selected sequence has been completed. When the device is in operation, the operator rotates the selector knob 22 to any desired position.

When the selector knob 22 is rotated to a desired position, it drives a chain 91 which, in turn, drives an idler shaft 92, which drives a lower chain 93. The chain 93 causes a pinion gear 94 to rotate. The pinion gear 94 controls the carriage drive indexing mechanism.

An eject rod 170 extends along the right-hand side of the spot filmer substantially throughout the longitudinal length of the frame 20. This rod 170 is visible in FIGURES 2 and 3. The rod is biased normally forwardly by a rod control spring 171, FIGURE 2. An ejection button 172 is provided and also normally biased forward by an eject button spring 173. The eject button has a rearwardly extending projection which engages the rod 170. When the eject button 172 is pressed rearwardly, it urges the rod 170 rearwardly with it causing a trip, not shown, on the rearward end of the rod to shift the longitudinal carriage positioning mechanism to an ejection position.

RECIPROCATING GRID

The spot filmer includes a reciprocating grid 200 which is reciprocally mounted in tracks 201 on the underside of the frame, FIGURE 3. A reciprocal grid drive rod 202 is also visible in FIGURES 3 and 6.

In spot film devices, it is preferable that the reciprocating grid can be stored rearwardly of the fluoroscopic screen 16 whenever one wishes to conduct a fluoroscopic study. This is especially desirable if an image intensification system and a closed circuit television unit is utilized rather than a fluorescent screen. At the same time, it is important to have the grid positionable beneath the cassette whenever a radiographic exposure is to be made. The present invention provides a greatly simplified mechanism for selectively positioning the reciprocating grid 200 beneath the cassette for reciprocal movement. A grid drive clamp 203 is provided. The details of construction of the grid drive clamp 203 are best seen in FIGURE 6.

The grid drive clamp 203 includes rearward and forward mirror image clamp arms 204, 205. These clamp arms 204, 205 are apertured at 206, 207. The grid drive rod 202 extends through the apertures 206, 207. A spring 208 is around the drive rod 202 and between the clamp arms 204, 205. The spring 208 biases the rearward and forward clamp arms 204, 205 outwardly about their pivots 209 until the walls defining the apertures 206, 207 frictionally and drivingly engage the grid drive rod 202. Thus, whenever the drive rod 202 is reciprocated, the grid drive clamp 203 will be caused to reciprocate with it. Since the grid drive clamp is fixed to the grid 200 the grid, of course, will also reciprocate.

If one wishes to shift the grid 200 forwardly, one need only press on the outer end of the rear clamp arm 204 causing it to disengage from the drive rod 202 as shown in phantom in FIGURE 30. This will also push the grid and grid drive clamp 203 forward while the forward clamp arm 205 will automatically disengage itself. As soon as forward pressure on the rear clamp arm 204 is released, the spring 208 will cause the clamp arms to grip the grid drive rod 202 in the selected position. Pressure on the forward clamp arm 205 will cause the reverse motion and permit facile parking of the grid under the rearward portion of the frame 20.

A limit switch 211 is provided which will break a circuit energizing grid motor 210 whenever the grid 200 is moved to a park position. The grid motor and its limit switch 210, 211 are shown only in the wiring diagram of FIGURE 5. The limit switch, of course, is positioned under the underside of the frame so that the grid itself will actuate it when the grid is moved to a park position. The motor may be suitably positioned on the frame for driving connection to the grid drive rod 202. Preferably the driving connection will be of the heart-shaped cam type described and claimed in U.S. Patent 2,767,323 issued October 16, 1956, mentioned above.

THE ELECTRICAL CIRCUIT

In FIGURE 5, a wiring diagram of the electrical circuit is shown. The switches in this diagram are positioned as though an exposure sequence had been completed and the spot filmer carriage 21 is in a parked position. When the mechanism is in this position, the operator will wish to depress the eject button 172 and cause the carriage 21 to move to the unload position of FIGURE 4.

When the eject button is pressed an eject switch 215 is closed. Simultaneously a momentary contact eject switch 216 is moved from the position shown in the wiring diagram to close a circuit energizing an eject relay 217. The relay 217, then, is energized through a circuit from one side of a line $L_1$, through a conductor 218 to the relay 217 then through conductor 219 to the eject switch 215 which is connected to the momentary eject switch 216 by a conductor 220. The momentary eject switch 216 is in turn connected through a conductor 221 to the other side of the line $L_2$.

When the relay 217 is energized a multiple contact solenoid controlled switch is actuated. This switch has a carriage motor contact 222, a grid motor contact 223, and an X-ray circuit contact 224. With the relay 217 energized this multiple contact switch is moved from the position shown to its other position where carriage motor 137 is energized in a forward direction. The energizing of the carriage motor 137 in a forward direction is accomplished through a conductor 225 which connects the carriage motor contact 222 to $L_1$. The contact 222 is in turn connected through contact 223 to a conductor 226, which extends to the forward direction side of the carriage motor 137. The carriage motor 137 is connected to the side $L_2$ of the line with another conductor 227.

So long as the eject button 172 is maintained in a depressed condition the momentary eject switch 216 will maintain this described relay energizing circuit closed and the carriage motor will operate to advance the carriage. When the carriage reaches the forward end of its travel two forward limit switches are tripped. One of these, 228 is connected to the conductor 226, breaking the circuit to the carriage motor 137 and stopping its rotation. The other switch which is triggered when the carriage reaches its forward position is a relay hold forward limit switch 229. This switch 229 is closed to parallel the eject switch 215. The relay hold limit switch 229 is connected to one contact of the momentary eject switch 216 by a conductor 230. When the carriage reaches the forward position, if the eject button 172 is maintained in a depressed condition, the previously described circuit will maintain the relay 217 in an energized condition. If the eject button is released, then the relay switch 217 is maintained in an energized condition through the relay hold switch 229, conductor 230, and thence through the momentary eject switch 216 to the line $L_2$ through the conductor 221.

A load light 231 is positioned on the forward end of the housing. This load light is lit whenever the relay 217 is energized. Thus, the load light 231 is connected in parallel with the relay 217 by a conductor 232. The purpose of the load light 231 is to indicate when the carriage is in its forward load and unload position.

A latch sensing switch 234 is mounted on the carriage for energization by a carriage lock (not shown). The latch switch 234 is open whenever the lock is in its lock position. A cassette-responsive switch 235 is connected in series with the latch switch 234. The cassette-responsive switch is positioned on the carriage for closure whenever a cassette is either partially or fully positioned in the carriage.

Whenever the carriage is in a forward position it cannot retract until either the latch switch 234 or the cassette switch 235 is open. This is true because the forward limit switch 229 is closed and a relay energizing circuit is maintained through the switches 229, 234, 235. Thus, if there is no cassette in the device, the cassette limit switch 235 will be open and the carriage can be retracted. If a cassette is properly positioned in the device, then the lock will be in its locked position and the latch switch 234 will be open. In either event, with either no cassette or a properly positioned and locked cassette, the carriage can be retracted to its parked position. At all other times, it is impossible to retract the carriage because both of these switches are closed. Thus, it is impossible to damage the mechanism by retracting the carriage when a cassette is improperly positioned on it.

A pair of forward motion preventing limit switches 236, 237 are provided and connected in parallel. These switches are provided to prevent forward motion of the carriage motor, other than for eject, if the mechanism has a cassette which is too large positioned in the carriage and an operator attempts to advance the carriage in one of the first six radiographic positions. Thus, the switch 237, visible in FIGURE 7, is a switch which is open if a cassette greater than 8″ in width is positioned in the carriage. The parallel switch 236 is automatically open whenever the selector knob 22 is in one of its first six positions of the usual eight positions. In other words, this switch 236 is open whenever lateral cassette movement is required for a selected exposure. In the wiring diagram both are shown in an open position to designate a cassette of greater than 8″ width with the selector knob in one of the positions in which such lateral movement is required.

A conductor 238 connects a double exposure light 239 to the one side of the line $L_1$. The light 239 is connected, in turn, to a double-exposure switch 120 by conductor 240. The double-exposure switch 120 is series connected with the parallel limit switches 236, 237 by conductor 241. They, in turn, are connected to the conductor 226 by another conductor 242. Thus, whenever a radiographic series is completed, the double-exposure switch 120 will move to the position shown in in the wiring diagram and the double exposure light will be lit. The double exposure light is a high resistance light so that although it is in series with the carriage motor 137, there is insufficient energy passing through the motor to cause it to drive the carriage in a forward direction. The eject forward circuit which has been described above parallels this double exposure light so that when the eject button is depressed, the carriage motor will drive the carriage forward to the unload position. At the same time, the double exposure light is shunted out. It will relight when the relay is de-energized and remain on when the carriage is returned to the park position until the mechanism is reset to move the double-exposure switch.

When it is desired to return the carriage to its parked position, first as noted above, it is essential that either a cassette is properly positioned or there is no cassette in the carriage. Assuming one or the other of those conditions to be the case, the eject button 172 is again depressed. This time the eject switch 215 is returned to its open position and the momentary eject switch 216 is again moved to the position where it connects the conductors 220 and 221 together. With the switches in this position all circuits which may energize the relay 217 are broken and the multiple-contact solenoid-energized switch returns to the position shown in the drawings.

With the multiple contact switch returned to its de-energized condition, the carriage motor contact 222 energizes a motor retract circuit. This retract circuit is from the contact 222 through a conductor 244 and then through a contact 245 of a push button advance switch 246. The contact 245 is connected to the reverse side of the reversible carriage motor 137 by a conductor 247. When the carriage reaches the parked position, the reverse limit switch 248 in the conductor 247 will be opened to conclude the reverse travel.

From the preceding discussion it will be seen that the contact 245 of the push button advance switch 246 is connected to the line $L_1$ whenever the solenoid 217 is de-energized. This connection is from the line $L_1$ through the conductor 225, the carriage motor contact 222, and then conductor 244, to the push button switch contact 245.

Assuming a cassette is loaded, the device is in the parked position, and the double-exposure switch has been reset, actuation for an exposure is obtained by depressing the push button advance switch 246. When the switch 246 is depressed, the contact 245 energizes a conductor 249 which is connected to the double-exposure switch 120. This energizes the carriage motor in a forward direction since the circuit is completed through the double-exposure switch 120, the conductor 241, one or both of the parallel limit switches 236 and 237, and then through the forward limit switch 228. When the device reaches the forward end of its travel in any of its indexed positions, the forward limit switch 228 is broken to de-energize the carriage motor.

Whenever the push button advance switch 246 is depressed, the circuit for the grid motor 210 is energized. This grid motor energizing circuit is from the contact 245 through the conductor 249 and thence conductor 250 to the grid contact 223. The grid motor is connected to the contact 223 by another conductor 251 while the motor is connected to $L_2$ by a final conductor 252. The grid limit switch 209 is in this last conductor 252 so that if the grid is in a fully-retracted position, the grid motor will not operate.

Preferably magnetic locks are provided throughout the entire table and spot filmer assembly to lock the various parts in their adjusted position. It will be seen that these magnetic locks are automatically energized through the conductor 250 either whenever the advance switch 246 is depressed or when the eject switch 172 is depressed to energize the relay 217. Thus, the magnetic locks are energized whenever the conductor 250 is energized either by the contact 222 when the relay 217 is energized, or by the contact 245 when the advance switch 246 is depressed.

Similarly, an X-ray circuit is controlled by both the relay 217 and the push button advance switch 246. Whenever the push button advance switch 246 is depressed a contact 253 is closed to energize the X-ray circuit. Depressing of this switch will not energize this circuit, however, if the relay 217 is energized because the X-ray circuit contact 224 breaks the X-ray circuit whenever the relay 217 is energized.

OPERATION

When the device is used, the eject button 172 is first depressed to move the carriage to the load and unload position of FIGURE 3. The operator inserts a cassette by passing it rectilinearly through the front load opening 66 against the chutes to guide the cassette into the cassette-supporting flanges 47, 48 on the jaws.

When the cassette is properly positioned in the carriage, the operator again depresses the eject switch 172. This breaks the circuit energizing the relay 217 and the load light 231, and allowing the device to automatically return to the park position.

When the carriage has fully returned to its parked position, the double exposure light 239 will continue to glow, serving at this time as a light to advise the operator that he must index the mechanism to a selected position. With the mechanism in the park position, he then rotates the selector knob 22 into a selected position. If this is one of the first six positions, it will open the limit switch 236; but again, if the cassette is of appropriate size, the limit switch 237 wll be closed.

When the mechanism is fully retracted, the double exposure light 239 will, as noted above, remain on until the device has been indexed to a new position and the double exposure switch 120 is tripped from its position shown in the wiring diagram. Because of the double-exposure switch one cannot commence a cycle with the step next succeeding the last step of the preceding cycle, but rather must index the mechanism to an appropriate and desired position.

Once the selector knob 22 has been rotated to a desired position, the advanced switch 246 is depressed and held throughout an exposure. This energizes the carriage motor 137 in a forward direction and causes the cassette carriage to move to an exposure position. Forward movement continues until the forward limit switch 228 is open. Thereafter, an exposure is completed with the timing being accomplished either manually or through any of the known automatic systems. Finally, the advance button 246 is released causing the carriage to retract. The rearward travel continues until the reverse travel limit switch 248 is broken and stops the motor.

This cycling is repeated until a selected radiographic series of exposures have been made. The final movement of the indexing mechanism in a given sequence will cause the double exposure switch to be tripped lighting the double exposure light 239 and advising the operator that his sequence has been completed. Additionally, the movement of the double-exposure switch 120 breaks the forward control circuit of the carriage motor 137, preventing the device from being advanced to an exposure position until the selector knob is rotated to adjust the device to a new sequence. Finally, the eject button is depressed to return the carriage to a load position and the cassette lock release button is depressed to eject the cassette and its exposed film.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a spot filmer having a frame with a front load opening and a carriage movably mounted on the frame, the combination of:
    (a) a drive means connected to the frame and the carriage for guiding the carriage through a selected one of a group of radiographic exposure sequences and selectively into a load position adjacent the front load opening;
    (b) cassette holding means on the carriage for retentively gripping a cassette inserted through said opening; and,
    (c) interlock means connected to the carriage and to the drive means to prevent movement of the carriage from the load position whenever a cassette is partially inserted in the cassette holding means and automatically enabling such movement whenever the cassette is fully inserted in the carriage.

2. In a spot filmer including a grid positionable in the path of an exposure stimulating beam of X-rays and beneath a cassette carriage in the spot filmer, the combination of:
    (a) track means on the filmer for carrying the grid;
    (b) the grid being reciprocally mounted on the track means;
    (c) a bar reciprocally mounted on the spot filmer and generally paralleling the track means;
    (d) movable connection means interposed between and forming a drive connection between the bar and the grid, said drive connection being releasable to permit rectilinear, adjusting, positioning movement of the grid along the track means; and,
    (e) drive means connected to the bar and carried by the spot filmer for selectively reciprocating the bar.

3. The device of claim 2 wherein a means to render the drive means ineffectual is carried by the spot filmer and actuatable by the grid when the grid is in a rearward park position.

4. The device of claim 3 wherein the grid drive means is an electric motor and wherein the means to render the motor ineffectual is a limit switch actuatable by the grid when the grid is in the park position.

5. In combination with a spot filmer:
    (a) a pair of tracks parallel mounted on the underside of the spot filmer;
    (b) a grid reciprocally and slidably mounted on the tracks;
    (c) a reciprocating bar mounted in the spot filmer and paralleling the tracks;
    (d) a pair of apertured clamp arms pivotally mounted on the grid and telescoped over the bar;
    (e) said arms being mirror images of one another;
    (f) a spring around the bar and interposed between the arms and normally biasing the arms into driving engagement with the bar; and,
    (g) said arms normally flaring away from one another from their respective pivots outwardly whereby pressure applied to one of the arms against the action of the biasing spring will pivot it out of locking engagement with the bar and cause sliding movement of the grid.

6. In a spot filmer including a carriage movably mounted in a frame and a power drive connected to the carriage to move the carriage, the combination of:
    (a) a control circuit for actuating the power means;
    (b) said control circuit including double exposure and load condition indicating means;
    (c) settable position control means for controlling movement of the carriage through a selected one of a plurality of sequences of exposure positions;
    (d) double exposure prevention means for energizing the double exposure condition indicating means each time the settable means is in the last position of any group whereby to advise the operator of a time to unload the spot filmer and a time to reset the settable means; and,
    (e) a switch connected to the frame and to the load condition indicating means, said switch being positioned for actuation whenever the carriage is in a load position, said load condition indicating means being actuated whenever the switch is actuated.

7. The device of claim 6 wherein the condition indicating means are lights.

8. In a spot filmer having a carriage movably mounted on a frame, the combination of:
    (a) a power drive connected to the frame and connected to the carriage for moving the carriage relative to the frame;
    (b) a settable position control means mounted on the frame for selectively providing one of a plurality of sequences of exposure positions;
    (c) said carriage having a park position and load and exposure positions;
    (d) manually actuatable means to cause the power drive to move the carriage from its park position to a selected one of the load and exposure positions;
    (e) circuit hold means to maintain the carriage in the load position whenever it is placed in such position; and, (f) circuitry for controlling the power drive and energizing the power drive to drive the carriage to its park position at all times other than when a selected one of the manually actuatable and hold means is actuated.

9. The device of claim 8 wherein reactuation of the manually actuatable means is required to release said hold means permitting such circuitry to operate to return the carriage to its parked position.

10. The device of claim 8 wherein the manually actuatable means includes a spring biased exposure button and a spring biased load button.

11. In a spot filmer having a frame and a carriage assembly movably mounted on the frame for positioning a cassette in a selected one of a plurality of positions for a radiographic exposure, the combination of, (a) settable position control means on the frame and operatively connected to the carriage, (b) a power drive connected to the frame and to the carriage, said power drive being controlled by the settable means and connected to the carriage for shifting the carriage selectively through a selected exposure sequence; and, (c) cassette sensing means connected to the power drive and including switch means positioned for actuation whenever a cassette of a size larger than a predetermined size is inserted in the carriage, said sensing means being for preventing actuation of the power drive whenever a cassette positioned in the carriage assembly has a dimension transverse of the spot filmer too large for a selected exposure sequence.

12. The device of claim 11 wherein the sensing means includes a pair of parallel connected electric switches, one of which is actuated by the settable means and the other of which is actuated by a cassette of a dimension transversely of the spot filmer larger than a predetermined dimension.

13. In a spot filmer having a frame and a carriage assembly movably mounted on the frame for positioning a cassette in a selected position for radiographic exposure the combination of, (a) settable position control means mounted on the frame for selecting one of a plurality of exposure sequences, (b) an electric motor connected to the carriage for shifting the carriage selectively through a selected exposure sequence, (c) said selectable sequences including at least one sequence wherein cross travel is not required, (d) electric circuitry connected to the motor for selectively energizing the motor; and, (e) said circuitry including energization preventing means adapted to sense cassette size for preventing energization of the motor in a sequence requiring cross travel when a cassette of a dimension transverse of the spot filmer larger than a predetermined dimension is positioned in the carriage.

14. The device of claim 13 wherein the energizing preventing means comprises a pair of parallel connected switches one actuated by the settable means when positioned for a sequence requiring cross travel and the other mounted on the carriage and actuatable by a cassette of a dimension larger than such predetermined dimension.

15. In a spot filmer having a frame with a front load opening and a carriage movably mounted on the frame, the combination of:

(a) a drive means operatively connected to the frame and to the carriage for guiding the carriage through a selected one of a group of radiographic exposure sequences and selectively into a load position adjacent the front load opening;

(b) cassette holding means on the carriage for retentively gripping a cassette inserted through said opening;

(c) a control circuit connected to the drive means, said circuit including:
   (i) a first switch means having a normally closed position when the carriage is empty and an open position when a cassette is in the carriage; and,
   (ii) a second switch means having a normally open condition and being closed by a cassette completely inserted in the carriage;

(d) each of said switch means when closed enabling said circuit to permit actuation of the drive means whereby said first switch means enables said drive circuit when the carriage is empty, said second switch means enables said drive means whenever a cassette is completely inserted in the carriage and one of switch means disables said circuit when a cassette is partially inserted in the carriage.

16. A spot filmer comprising:
(a) a frame;
(b) a carraige movable on the frame from a storage position selectively one at a time to a selected one of a load position and a plurality of exposure positions;
(c) a power drive connected to the carriage and to frame for moving the carriage;
(d) said power drive being arranged to normally shift the carriage to its park position;
(e) manually actuatable control means connected to the power drive for actuating the power means to move the carriage to a selected one of said load and exposure positions;
(f) circuit hold means actuatable by the carriage when the carriage is shifted to the load position for maintaining the carriage in the load position;
(g) release means connected to the hold means and actuatable to release the hold means to permit the carriage to move the park position; and,
(h) jam preventing means connected to at least a selected one of the power means and the release means and rendering the selected one of said means ineffectual whenever a cassette is in the carriage in an unlatched position thereby preventing retraction of the carriage.

17. In a motor driven spot filmer having a front load opening and a carriage movable to a load position adjacent the load opening:
(a) an electric circuit for energizing the motor;
(b) said circuit including means for maintaining the carriage in the load position; and,
(c) said circuit also including means for preventing the retraction of the carriage from the load position when a cassette is in the carriage in an unlatched condition.

18. The device of claim 17 wherein the means for preventing retraction of the carriage includes a first switch actuated by a cassette lock when the lock engages a properly positioned cassette and a second switch actuated by a cassette when it is inserted into the carriage, whereby to permit the carriage to be retracted either with a properly latched cassette or when empty.

19. In a spot filmer including a carriage movably mounted on a frame and a power means to shift the carriage from one position to another, the combination of:
(a) circuitry connected to the power means for energizing the power means;
(b) said circuitry including:
   (i) a load light and a double exposure light;
   (ii) means for energizing the load light when the carriage is in a cassette load position; and,
   (iii) other means to energize the double exposure light whenever a selected sequence of exposure positions has been completed whereby to apprise the operator of the need for unloading the mechanism and resetting the settable means.

References Cited by the Examiner

UNITED STATES PATENTS

| | | | |
|---|---|---|---|
| 2,467,592 | 4/49 | Morgan et al. | 250—63 |
| 2,552,858 | 5/51 | Mueller et al. | 250—66 X |
| 2,567,566 | 9/51 | Kizaur | 250—108 X |
| 2,668,913 | 2/54 | Goldfield et al. | 250—62 |
| 2,709,221 | 5/55 | Haupt et al. | 250—93 X |
| 2,749,445 | 6/56 | Stava et al. | 250—62 X |
| 2,811,648 | 10/57 | Leishman et al. | 250—66 |
| 2,834,890 | 5/58 | Bastin et al. | 250—66 |
| 2,835,824 | 5/58 | Schepker | 250—108 |
| 2,858,445 | 10/58 | Kizaur et al. | 250—66 |
| 2,921,202 | 1/60 | Berger et al. | 250—66 X |
| 2,924,717 | 2/60 | Koerner et al. | 250—66 |
| 2,938,120 | 5/60 | Forsyth | 250—62 |
| 3,048,696 | 8/62 | Koerner et al. | 250—66 |
| 3,069,544 | 12/62 | Kizaur et al. | 250—66 |
| 3,105,903 | 10/63 | Sano et al. | 250—66 |

RALPH G. NILSON, *Primary Examiner*.